(12) United States Patent
Morikawa et al.

(10) Patent No.: US 6,754,149 B2
(45) Date of Patent: Jun. 22, 2004

(54) SIGNAL PROCESSING APPARATUS AND SIGNAL PROCESSING METHOD

(75) Inventors: Keiji Morikawa, Kanagawa (JP); Yuji Saito, Tokyo (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 09/862,669

(22) Filed: May 21, 2001

(65) Prior Publication Data

US 2001/0044665 A1 Nov. 22, 2001

(30) Foreign Application Priority Data

May 22, 2000 (JP) ........................................ 2000-154426

(51) Int. Cl.[7] .............................................. G11B 5/09
(52) U.S. Cl. ................................ 369/47.31; 369/59.26; 369/124.08
(58) Field of Search ........................... 369/47.12, 47.13, 369/47.21, 47.22, 47.31, 59.23, 59.26, 124.07, 124.08

(56) References Cited

U.S. PATENT DOCUMENTS 5,691,967 A * 11/1997 Ando ...................... 369/47.44

* cited by examiner

Primary Examiner—Paul W. Huber
(74) Attorney, Agent, or Firm—Frommer Lawrence & Haug LLP; William S. Frommer

(57) ABSTRACT

An encoder & decoder unit for encoding data to be recorded has a data-supply-start-signal-generating circuit for generating an ATTX signal requesting that an operation to supply the data to be recorded to the encoder & decoder unit be started by counting 88.5 frames starting at detection of the rising edge of a 1F•START signal by an address decoder. The encoder & decoder unit also includes a laser-power-switching-signal-generating circuit for generating an ATRECP signal making a request for switching of a laser power by counting 49 frames starting at detection of the rising edge of an FD•START signal by the address decoder. A system controller thus needs to generate an RECXPB signal requesting that a recording operation from the next cluster be started only at a precision of about 2 seconds with respect to the period of 1 cluster. In this way, it is possible to provide a degree of precision higher than execution of timing control by using the system controller external to the encoder & decoder unit.

7 Claims, 9 Drawing Sheets

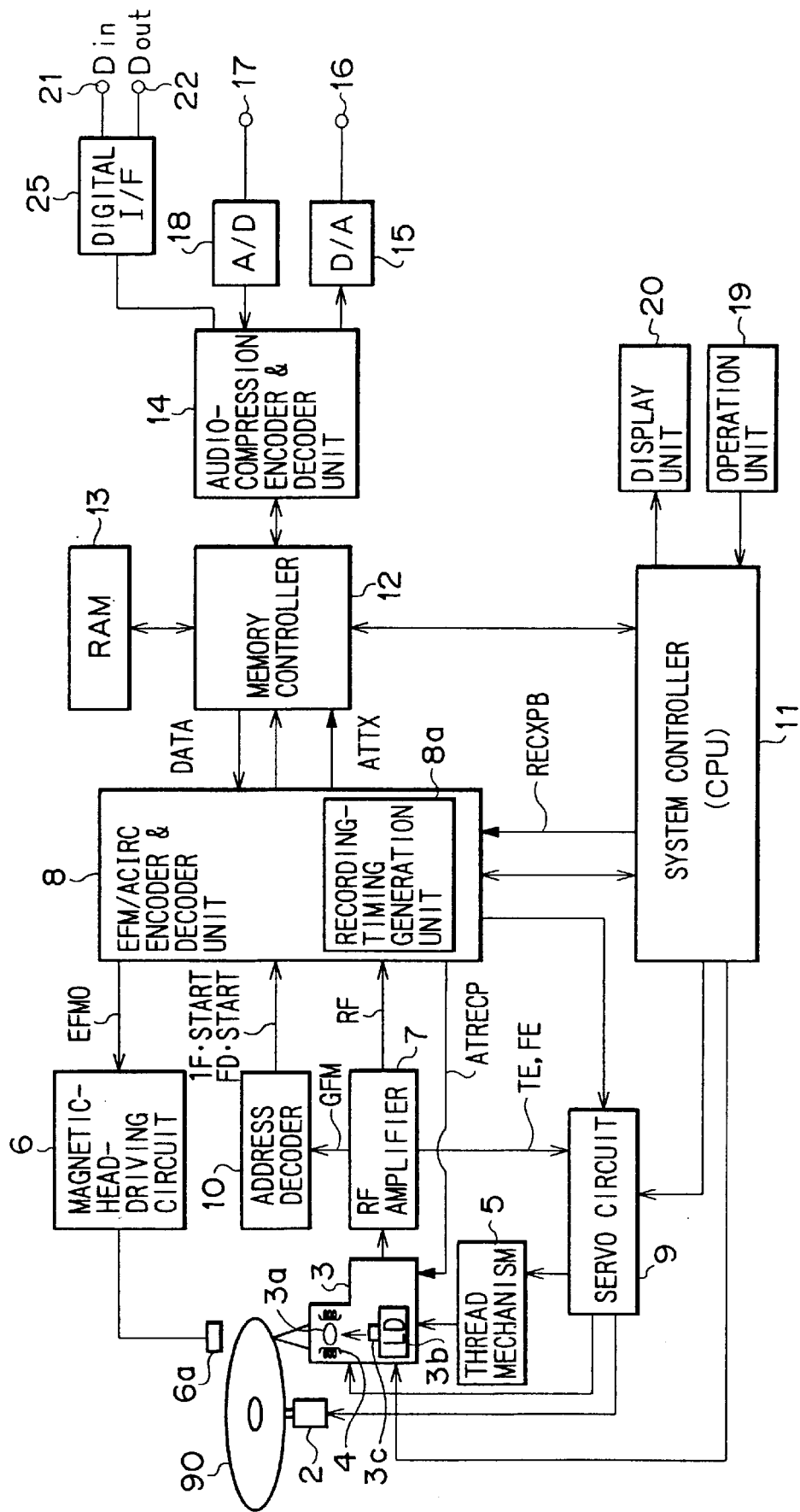
F I G. 1

SIGNAL PROCESSING APPARATUS AND SIGNAL PROCESSING METHOD

BACKGROUND OF THE INVENTION

The present invention relates to a signal-processing apparatus which is mounted on typically recording apparatus, used for inputting data, carrying out a predetermined encoding process on the input data and outputting the encoded data as data to be recorded, as well as relates to a signal-processing method adopted by the signal-processing apparatus.

The so-called MD (Mini Disk) has been becoming very popular in recent years as media that can be used for recording and playing back audio data. The MD is a kind of magneto-optical disk which has a disk shape and can be used for recording and playing back audio data in accordance with a magneto-optical system.

As is generally known, in recording & playback apparatus for recording data onto and playing back data from an MD, compressed audio data is transferred into a buffer memory at a predetermined transfer speed during a recording operation to be stored in the buffer memory. An operation to write data from the buffer memory into the MD is carried out when the amount of data stored in the buffer memory exceeds a predetermined value. The data is read out from the buffer memory at a transfer speed higher than the transfer speed used during the operation to write data into the buffer memory. Before being written into the MD, the data is subjected to a predetermined modulation process appropriate for the disk recording. The modulation process includes EFM modulation and addition of error correction codes. The operation described above is carried out repeatedly. That is to say, in a recording operation, data is written into the disk intermittently.

In addition, in an MD format, a smallest recording unit of data is prescribed. The smallest recording unit is referred to as a cluster. That is to say, during an interval of the intermittent recording described above, data of at least 1 cluster is written into the disk.

Typically, the structure of a cluster is an array of 36 smaller data units each called a sector. The head of a cluster typically comprises 3 such sectors serving as an area for linking. Referred to as a linking area, the area for linking is not used for storing actual data. A data area follows the linking area. A middle position of the linking area of a cluster is prescribed as a linking point serving as a linking position between the cluster and the preceding cluster. The operation to record data and the processing to play back a predetermined signal in cluster units are carried out with this linking point taken as a reference point.

The power of a laser beam radiated to the MD during a recording operation carried out intermittently as described above is set at a high level in a period of time to write data into the disk. The high-level power of the laser beam is referred to as a write power. During a pause period in which no data is written onto the disk, on the other hand, the power of the laser beam is set at a low level corresponding to a playback operation. The low-level power of the laser beam is referred to as a read power.

By setting a write power during a data-writing period, the signal surface of the disk can be heated to a Curie temperature. During a pause period, on the other hand, the read power is set, allowing address information recorded on an MD track as the so-called zigzag groove to be read out from the MD track so as not to damage the data which has been already recorded on the disk.

In a transition from a pause period to a data-writing period, the power of the laser beam is switched from the read power to the write power with a timing to start an operation to write data into the disk from a position indicated by the linking point described above.

It is thus necessary to issue a command as to a timing to start an operation to supply typically a sector including the linking point as a timing to start operations to read out data from the buffer memory and supply the data to be recorded to an encoding process circuit.

In addition, it is also necessary to issue a command for switching the power of the laser beam from the read power to the write power with a timing to output the linking point described above from the encoding process circuit after a delay time required for carrying out an encoding process in the encoding process circuit.

Such timing control is executed in the recording & playback apparatus by a system controller employing typically a microcomputer and other components. The system controller obtains information on an address in a disk by communication with typically the encoding process circuit. Then, while monitoring addresses, the system controller measures time from typically the number of EFM frames. From the measured time, the system controller obtains a timing to start an operation to supply data to be recorded to the encoding process circuit. With this timing, the system controller outputs a data-input-start control signal to start a transfer of data from the buffer memory to an EFM signal processing system. In addition, the system controller also obtains information on a timing to switch the power of the laser beam from the read power to the write power. With this timing, the system controller outputs a laser-power-switching control signal to a driving circuit of a laser diode.

It should be noted that an EFM frame cited above is one of units for handling data to be recorded as EFM-modulated data. For example, 1 sector consists of 98 EFM frames each corresponding to a time duration of 13.3 ms.

In accordance with the MD format, the precision of the data-input-start-control signal shall be in the range of 36 frames, that is, from −10 frames to +26 frames. Expressed in terms of time, the range corresponds to about 5 ms at a 1-time CLV (Constant Linear Velocity).

On the other hand, stricter precision of +/−10 EFM frames is prescribed for the laser-power-switching control signal in order to keep up with a timing of a single point on data, namely, the linking point. Expressed in terms of time, the range of this precision corresponds to about 1.3 ms at a 1-time CLV.

If the margin of each of the precision ranges is exceeded, for example, linking of data to be recorded becomes unstable, deteriorating the quality and it is quite within the bounds of possibility that a playback error is generated during a playback operation. The system controller operates to output each of the control signals described above, within the margins of the ranges described above.

By the way, as is already known in recent years, it is possible to record data onto an MD at a multiple-time speed, that is, a speed higher than the 1-time CLV cited above, and there is a trend to promote an effort to further increase the multiple-time speed.

At a higher recording speed, the time margin of the timing control executed at the start of a recording operation becomes stricter. Thus, the system controller is required to operate with an even higher degree of precision.

Since the signal-processing timing of a modulation processing circuit is controlled by an external controller, however, there is a limit on the improvement of the degree of precision with which the system controller executes the timing control at the start of a recording operation. If data is to be recorded at an extremely high speed, for example, it will be quite within the bounds of possibility that a sufficiently good quality of recorded data can no longer be guaranteed.

SUMMARY OF THE INVENTION

It is thus an object of the present invention addressing the problems described above to maintain a sufficiently good quality of recorded data by execution of an operation required at the start of a recording operation with a highly precise timing, even at a higher recording speed.

In order to achieve the object described above, the present invention provides a signal-processing apparatus for carrying out a recording operation to record data onto a recording medium in predetermined recorded-data units. The recorded-data unit is an array consisting of a predetermined number of division-data units each comprising a predetermined number of encoded-data units. The signal-processing apparatus also carries out signal processing for the recording operation in conformity with a format prescribing a linking area for linking consecutive recorded-data units to each other.

The signal-processing apparatus comprises an encoding means for inputting data, carrying out predetermined signal processing suitable for an operation to record the input data onto the recording medium and outputting data to be written into the recording medium and a timing generation means for generating a timing signal indicating a timing to start an operation to provide the encoding means with the division-data units including a linking point described in the linking area by counting the predetermined number of the encoded-data units with a timing to detect address information for a specific one of the division-data units from the recording medium.

In addition, the present invention also provides a signal-processing method for carrying out a recording operation to record data onto a recording medium in predetermined recorded-data units. The recorded-data unit is an array consisting of a predetermined number of division-data units each comprising a predetermined number of encoded-data units. In accordance with the signal-processing method, signal processing is also carried out for the recording operation in conformity with a format prescribing a linking area for linking consecutive recorded-data units to each other.

The signal-processing method comprises the steps of carrying out an encoding process to input data, perform predetermined signal processing suitable for an operation to record the input data onto the recording medium and output data to be written into the recording medium and carrying out a timing generation process to generate a timing signal indicating a timing to start processing carried out in the encoding process on the division-data units including a linking point described in the linking area by counting the predetermined number of encoded-data units with a timing to detect address information for a specific one of the division-data units from the recording medium.

Furthermore, the present invention also provides another signal-processing apparatus for carrying out a recording operation to record data onto a recording medium in predetermined recorded-data units. The recorded-data unit is an array consisting of a predetermined number of division-data units each comprising a predetermined number of encoded-data units. The other signal-processing apparatus also carries out signal processing for the recording operation in conformity with a format prescribing a linking area for linking consecutive recorded-data units to each other.

The other signal-processing apparatus comprises an encoding means for inputting data, carrying out predetermined signal processing suitable for an operation to record the input data onto the recording medium and outputting data to be written into the recording medium, a timing generation means for generating a timing signal indicating a timing to start an operation to provide the encoding means with division-data units including a linking point each described in the linking area by counting the predetermined number of encoded-data units with a timing to detect address information for a specific one of the division-data units from the recording medium and a linking-point detection means for detecting a timing to output a signal indicating the linking point from the encoding means by counting the predetermined number of encoded-data units with a timing to detect address information for a specific one of the division-data units from the recording medium.

Moreover, the present invention also provides another signal-processing method for carrying out a recording operation to record data onto a recording medium in predetermined recorded-data units. The recorded-data unit is an array consisting of a predetermined number of division-data units each comprising a predetermined number of encoded-data units. In accordance with the other signal-processing method, signal processing is also carried out for the recording operation in conformity with a format prescribing a linking area for linking consecutive recorded-data units to each other.

The other signal-processing method comprises the steps of carrying out an encoding process to input data, perform predetermined signal processing suitable for an operation to record the input data onto the recording medium and output data to be written into the recording medium, carrying out a timing generation process to generate a timing signal indicating a timing to start processing carried out in the encoding process on the division-data units including a linking point described in the linking area by counting the predetermined number of encoded-data units with a timing to detect address information for a specific one of the division-data units from the recording medium and carrying out a linking-point detection process to detect a timing of the encoding process to output a signal indicating the linking point by counting the predetermined number of encoded-data units with a timing to detect address information for a specific one of the division-data units from the recording medium.

As described above, the present invention provides signal-processing apparatuses and signal-processing methods adopted in the signal-processing apparatuses for recording data onto a recording medium in predetermined recorded-data units wherein the recorded-data unit is an array consisting of a predetermined number of division-data units each comprising a predetermined number of encoded-data units, and for carrying out signal processing for the recording operation in conformity with a format prescribing a linking area.

The number of encoded-data units is counted on the basis of specific address information detected from the recording medium in order to specify a timing to start signal processing or to detect a timing to indicate a linking point of output data according to the specified timing to start the signal processing.

In such a configuration, the detection of a timing to start signal processing and a timing to indicate a linking point do not rely on control executed by an external controller. Instead, a timing to start signal processing and a timing to indicate a linking point can be detected only by means inside the signal-processing apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a typical configuration of recording & playback apparatus implemented by an embodiment of the present invention;

PREFERRED EMBODIMENT OF THE INVENTION

A preferred embodiment of the present invention is described as follows.

A preferred embodiment of the present invention implements recording & playback apparatus capable of recording audio data onto and playing back audio data from a magneto-optical disk serving as an MD (Mini Disk).

It should be noted that, in the following description of the preferred embodiment, at the start of an operation to write data onto a disk, an encoder for carrying out EFM processing among other processes outputs a data-supply-start signal indicating the start of an operation to supply data to be recorded to the encoder and a laser-power-switching signal indicating a timing to switch the laser power. The data-supply-start signal and the laser-power-switching signal are together referred to as a recording-timing signal. Processing and operations to generate the recording-timing signal are referred to as a recording-timing generation process.

The embodiment is described in the following order:

1: Disk Format
2: Configuration of the Recording & playback apparatus
3: Configuration of the Encoder
4: Recording-Timing Generation Process
5: Configuration of a Circuit for Recording-Timing Generation 1: Disk Format The description begins with an explanation of the format of a magneto-optical disk serving as an MD which data is recorded onto and played back from in accordance with the embodiment.

As is generally known, a magneto-optical disk serving as an MD compatible with the embodiment is divided into two major portions, namely, a pit area for recording data as emboss pits and a groove area where tracks are each created as a groove. The groove area is treated as a magneto-optical area. The pit area is created on the innermost-circumference side of the disk and the groove area is created on the outer-circumference side following the pit area.

The pit area is used for recording unrewriteable management information known as a P-TOC. As described above, the groove area follows this pit area. The beginning of the groove area is a management area used for recording rewriteable management information known as a U-TOC in a predetermined format. In the groove area, the management area is followed by a program area starting from the end location of the management area and ending at a location immediately preceding the start position of a read-out area. The program area is used for recording audio data.

Figure 8:
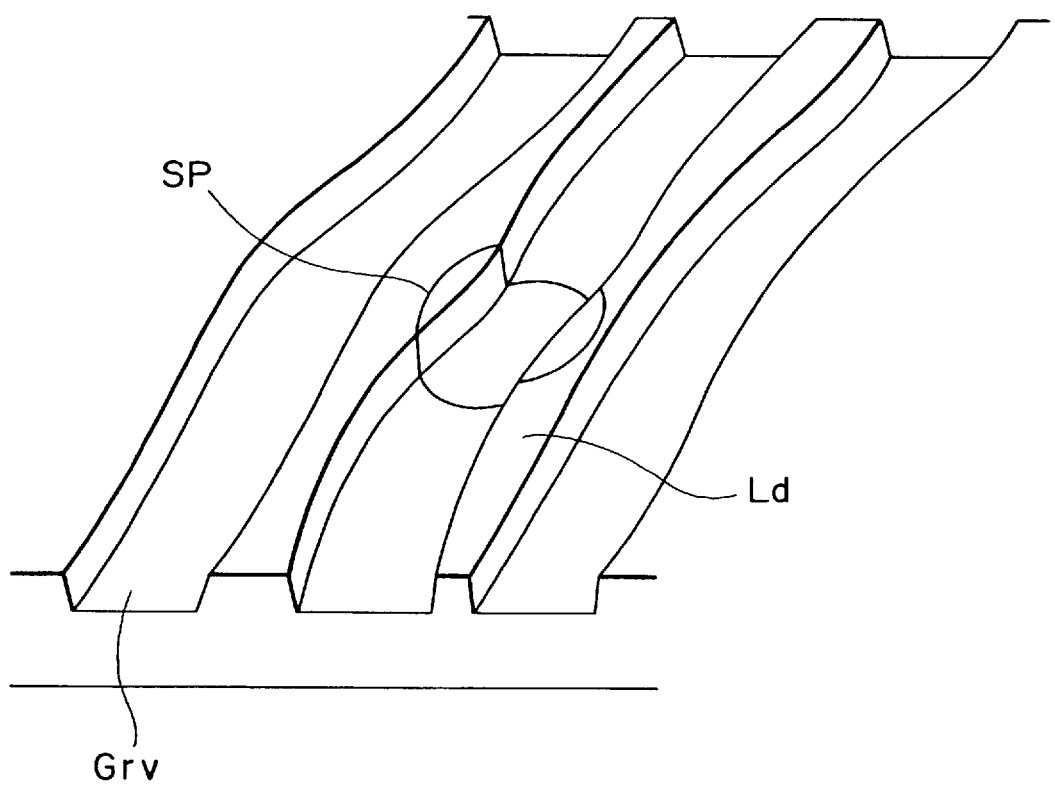
FIG. 8 is a perspective view showing a model representing an enlarged signal surface of a groove area on a mini disk.

FIG. 8 is a diagram showing an enlarged signal surface of the groove area.

First of all, the side surfaces of a recording track in a groove area are each formed into a zigzag shape to create a wobbled groove Grv along the recording track. The wobbled groove is actually created into a spiral shape from an inner circumference to an outer circumference. In a recording or playback operation, tracking control is executed so as to properly trace this wobbled groove Grv by using a laser spot Sp radiated by an optical head.

Two adjacent wobbled grooves Grv (or recording tracks) sandwich a land Ld. Thus, wobbled grooves and lands are placed alternately in the radial direction of the disk.

The zigzag shape of the wobbled groove Grv is formed to resemble the waveform of a signal obtained as a result of modulation of address information based on a predetermined system such as an FM modulation technique. That is to say, the zigzag shape of the wobbled groove is grasped as information conveyed by a reflected beam and, by demodulating a beam signal for the information, the absolute address of a location on the disk can be recognized.

Figure 9:
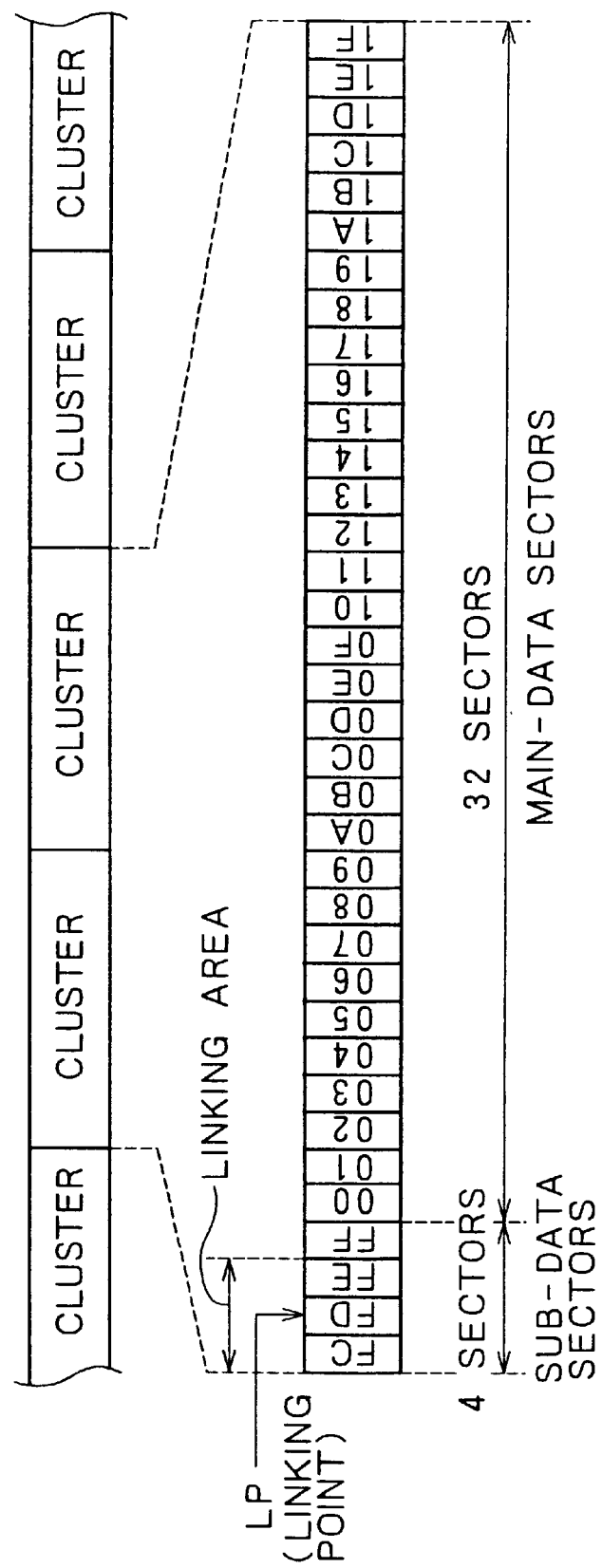
FIG. 9 is an explanatory diagram showing the structure of a sector in a mini disk.

FIG. 9 is a diagram showing the format of data recorded on an MD.

As shown in the figure, data is recorded on an MD as units known as clusters, each of which is the smallest recording unit. That is to say, data is recorded onto a disk in smallest units called clusters.

1 cluster comprises 36 sectors. 32 sectors denoted by reference numerals 00 to 1F in FIG. 9 are main-data sectors for recording actual audio data, management information and the like. The remaining 4 sectors denoted by reference numerals FC to FF at the beginning of a cluster are used as a linking area for storing dummy data for the purpose of linking consecutive clusters. However, at least the sector FF is prescribed as a sector usable as a sub-data area. Thus, the true linking area is the 3 sectors FC to FE. The operation to write data in cluster units is possible by linking a cluster to the next cluster using this linking area. That is to say, when an operation to write data into a cluster is ended, the operation is continued by starting to write the next cluster which starts at the linking area of the next cluster. In this way, the continuity of an operation to write or read out data is established.

The start position of an operation to write or read out data in a next cluster is a position in the linking area prescribed as a linking point LP. That is to say, the linking point LP can be regarded as a boundary between 2 consecutive clusters. To put it in detail, the linking point LP is approximately a middle position in the linking area where the 3 consecutive sectors FC, FD and FE exist as shown in the figure. 1 sector consists of 98 EFM frames. The position of the sector FD is prescribed to be in a range with a margin of +/−10 EFM frames relative to the 49$^{th}$ EFM frame of the sector FD.

2: Configuration of the Recording & Playback Apparatus

FIG. 1 is a block diagram showing main components of the recording & playback apparatus implemented by the embodiment.

A spindle motor 2 drives rotation of a magneto-optical disk 1 serving as an MD that can be used for recording audio data and allows recorded audio data to be played back therefrom. In an operation to record data onto the magneto-optical disk 1 or play back data therefrom, an optical head 3 radiates a laser beam to the magneto-optical disk 1.

In a recording operation, the optical head 3 outputs a laser beam at a high level to heat a recording track of the magneto-optical disk 1 to the Curie temperature. In a playback operation, on the other hand, the optical head 3 outputs a laser beam at a relatively low level for detecting data from a beam reflected by a Kerr effect.

In order to output such laser beams, the optical head 3 is provided with an optical system and a detector for detecting the reflected beam. The optical system comprises a laser driver 3b, a laser diode 3c, a polarization beam splitter and an object lens 3a. The object lens 3a is supported by a 2-axis mechanism 4 in such a way that the object lens 3a can be moved in the radial direction of the magneto-optical disk 1 and a direction tangential to circumferences of the magneto-optical disk 1. The laser driver 3b drives the laser diode 3c so as to set laser powers proper for recording and playback operations respectively. The laser diode 3c radiates a laser beam to the object lens 3a.

A magnetic head 6a is provided on the side opposite to the optical head 3 with respect to the magneto-optical disk 1 at a position corresponding to the optical head 3, sandwiching the magneto-optical disk 1 in conjunction with the optical head 3. The magnetic head 6a carries out an operation to apply a magnetic field modulated by data supplied thereto to the magneto-optical disk 1.

The optical head 3 and the magnetic head 6a can be moved in the radial direction of the magneto-optical disk 1 by a thread mechanism 5.

In a playback operation, the optical head 3 supplies information detected from the magneto-optical disk 1 to an RF amplifier 7. By arithmetic processing the supplied information, the RF amplifier 7 extracts a playback RF signal, a tracking-error signal TE, a focus-error signal FE and groove information GFM to mention a few. The groove information GFM is absolute-position information recorded on the magneto-optical disk 1 as the wobble groove Grv shown in FIG. 8.

The extracted playback RF signal is supplied to an EFM/ACIRC encoder & decoder unit 8. The tracking-error signal TE and the focus-error signal FE are supplied to a servo circuit 9. The groove information GFM is supplied to an address decoder 10.

The servo circuit 9 generates a variety of servo-driving signals based on the tracking-error signal TE and the focus-error signal FE, a track-jump command, an access command and rotation-speed detection information to mention a few. The track-jump command and the access command are issued by a-system controller 11 implemented by typically a microcomputer. The rotation-speed detection information is generated by the spindle motor 2. The servo-driving signals are output to the two-axis mechanism 4 and a thread mechanism 5 for controlling focusing and tracking and output to the spindle motor 2 for adjusting speed thereof at a constant linear velocity (CLV).

The address decoder 10 decodes the groove information GFM supplied thereto to extract an ADIP (Address In PreGroove) signal representing information on an absolute address in the magneto-optical disk 1. The address decoder 10 supplies the ADIP signal to the system controller 11 to be used in a variety of control operations.

In particular, the address decoder 10 employed in this embodiment generates a 1F•START signal and an FD•START signal which are based on the ADIP signal as will be described later. The 1F•START signal and the FD•START signal show start timings of the IF and FD sectors respectively. The address decoder 10 supplies the 1F•START and FD•START signals to the EFM/ACIRC encoder & decoder unit 8 to be used in a recording-timing generation process.

The EFM/ACIRC encoder & decoder unit 8 also carries out decoding processes such as EFM demodulation and ACIRC on the playback RF signal and also extracts data such as an address and sub-codes from the playback RF signal. The EFM/ACIRC encoder & decoder unit 8 then supplies the extracted data to the system controller 11.

Audio data (sector data) completing the decoding processes such as EFM demodulation and ACIRC carried out by the EFM/ACIRC encoder & decoder unit 8 is temporarily stored by a memory controller 12 in a buffer memory 13. It should be noted that data is fetched by the optical head 3 from the magneto-optical disk 1 and transferred from the optical head 3 to the buffer memory 13 in a system at a playback-data transfer speed of 1.41 Mbit/sec and usually in an intermittent manner.

The data stored in the buffer memory 13 is read back from the buffer memory 13 with timings to give a playback-data transfer speed of 0.3 Mbit/sec, and then supplied to an encoder & decoder unit 14. The encoder & decoder unit 14 carries out playback-signal processing such as decompression (serving as an opposite counterpart of audio compression) on the data read back from the buffer memory 13 and supplies data obtained as a result of the playback-signal processing to a D/A converter 15 for converting the data into an analog signal. The D/A converter 15 supplies the analog signal to a predetermined amplifier circuit by way of an output terminal 16 as a playback signal. For example, the signal produced by the D/A converter 15 is output as L and R analog audio signals.

In addition, the encoder & decoder unit 14 may also supply a digital audio signal obtained as a result of the playback-signal processing to a digital interface unit 23 which then outputs the digital audio signal to external equipment by way of a digital-output terminal 22 as a digital audio signal Dout.

In an operation to record data onto the magneto-optical disk 1, on the other hand, a recording signal (that is, an analog audio signal to be recorded) supplied to the recording & playback apparatus by way of an input terminal 17 is converted by an A/D converter 18 into digital data which is then supplied to the encoder & decoder unit 14 for carrying out an audio compression & encoding process on the digital data.

A digital audio signal Din may be supplied to the recording & playback apparatus by way of a digital-input terminal 21 from an external apparatus. In this case, a digital interface unit 25 extracts information such as control codes from the digital audio signal Din and supplies the signal Din to the encoder & decoder unit 14 for carrying out an audio compression & encoding process on the digital data.

It should be noted that a signal received from a microphone by way of a microphone-input terminal not shown in the figure can of course be treated as a signal to be recorded as well.

The compressed data to be recorded from the encoder & decoder unit 14 is temporarily stored by the memory controller 12 in the buffer memory 13. At a point of time the amount of data stored in the buffer memory 13 exceeds a predetermined quantity, the data is read out back from the buffer memory 13 and supplied to the EFM/ACIRC encoder & decoder unit 8 in predetermined data units such as cluster units. The EFM/ACIRC encoder & decoder unit 8 then carries out encoding processes such as CIRC encoding and EFM modulation on the data before supplying the data to a magnetic-head-driving circuit 6.

Then, the magnetic-head-driving circuit 6 provides the magnetic head 6a with a magnetic-head driving signal according to the encoding-processed data to be recorded. Driven by the magnetic-head driving signal, the magnetic head 6a applies N and S magnetic fields to the magneto-optical disk 1.

By temporarily storing the continuous input data in the buffer memory 13, the continuous data can be recorded onto the magneto-optical disk 1 intermittently.

In order to implement such an intermittent recording operation, the EFM/ACIRC encoder & decoder unit 8 employed in this embodiment is provided with a recording-timing generation unit 8a for carrying out a recording-timing generation process based on 1F•START and FD•START signals received from the address decoder 10.

The operation to supply data stored in the buffer memory 13 to the EFM/ACIRC encoder & decoder unit 8 is started by a command issued to the memory controller 12 at a point of time the amount of stored data exceeds a predetermined quantity as described above. In this embodiment, the recording-timing generation unit 8a detects a timing to start the operation to supply data stored in the buffer memory 13 to the EFM/ACIRC encoder & decoder unit 8. With this detection timing, the recording-timing generation unit 8a provides the memory controller 12 with a data-supply-start signal ATTX for making a request for a start of the operation to supply data stored in the buffer memory 13 to the EFM/ACIRC encoder & decoder unit 8. The memory controller 12 starts the operation to supply data stored in the buffer memory 13 to the EFM/ACIRC encoder & decoder unit 8 in accordance with this data-supply-start signal ATTX.

In addition, in a recording operation, a laser beam is radiated to the mini disk at a laser power referred to as a write power set at a high level capable of heating the signal surface of the mini disk to the Curie temperature as described above. In a playback operation, on the other hand, a laser beam is radiated to the mini disk at a laser power referred to as a read power set at such a level that the signal surface does not reach the Curie temperature. It is thus necessary to switch the laser power set in the laser driver 3b employed in the optical head 3 in a transition from a read operation to a write operation or vice versa. Even during the intermittent recording operation, it is necessary to set the laser power at the write power during a period of time to record data onto the magneto-optical disk 1 and at the read power during a pause period of time to record no data onto the magneto-optical disk 1. Thus, in an operation to record data onto the magneto-optical disk 1, for example, the laser power must be switched from the read power to the write power at the beginning of a recording operation.

In this embodiment, the recording-timing generation unit 8a detects a timing to switch the laser power described above. With this detected timing, the recording-timing generation unit 8a outputs a laser-power-switching signal ATRECP requesting that the laser power be switched from the read power to the write power to the laser driver 3b employed in the optical head 3.

On the other hand, in the conventional recording & playback apparatus for example, the data-supply-start signal indicating the start of the aforementioned operation to supply data and the laser-power switching signal are output by the system controller 11 upon determination of their timings by monitoring the ADIP signal. That is to say, the processing timings of the EFM/ACIRC encoder & decoder unit 8 are controlled by the external system controller 11.

In the case of the present embodiment, on the other hand, what should be done by the system controller 11 is an operation to output only a recording-start signal RECXPB to the EFM/ACIRC encoder & decoder unit 8 to request the EFM/ACIRC encoder & decoder unit 8 that the recording operation be started or ended from the next cluster.

An operation unit 19 has a variety of keys to be operated by the user. The keys include a recording key, a playback key, a halt key, an AMS key, a fast-forward key and a fast-rewind key. Information on an operation key pressed by the user is supplied to the system controller 11.

Typically, a liquid-crystal display device is used as a display unit 20 for displaying operation status, a track number and time information under control executed by the system controller 11.

3: Configuration of the Encoder

Figure 2:
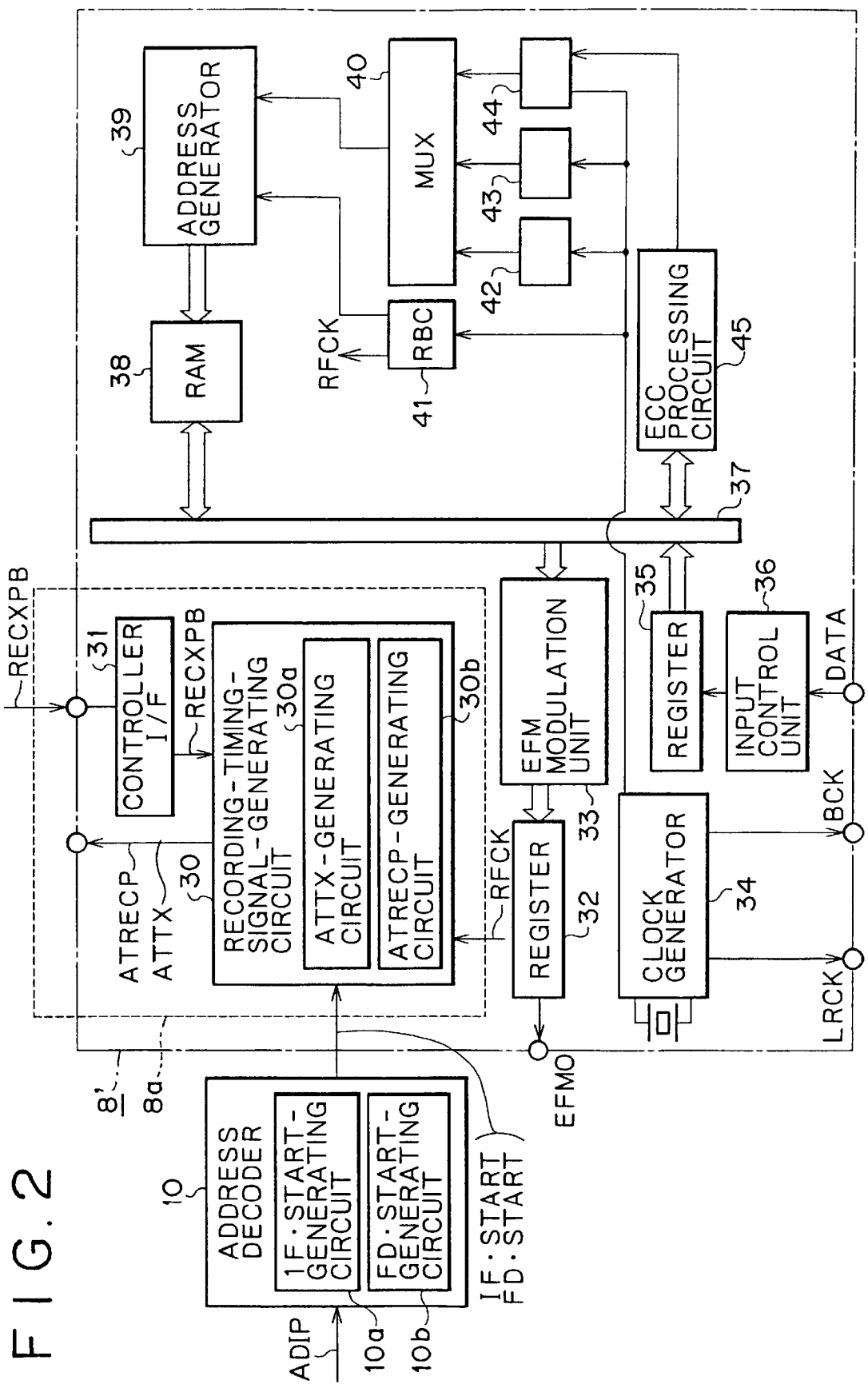
FIG. 2 is a block diagram showing main components of an encoder & decoder unit functioning as an encoder.

FIG. 2 is a block diagram showing main components of the EFM/ACIRC encoder & decoder unit 8 functioning as an encoding portion 8'.

As also described earlier, recording data compressed by the encoder & decoder unit 14 is temporarily stored in the buffer memory 13 by the memory controller 12. The memory controller 12 then reads back the recording data DATA from the buffer memory 13 and supplies the data to the EFM/ACIRC encoder & decoder unit 8 in accordance with the data-supply-start signal ATTX.

First of all, the data supplied to the encoding portion 8' is latched in a register 35 through an input control unit 36. Then, the data latched in the register 35 is transferred to a RAM 38 through a data bus 37. The data stored in the RAM 38 is subjected to an ACIRC encoding process in an ECC processing circuit 45, an address generator 39 and a C1/C2-request-generating unit 44 before being stored back in the RAM 38.

The data completing the ACIRC encoding process is read out from the RAM 38 at a request made by a RAM-read-request-generating unit 42 and supplied to an EFM modulation unit 33. The EFM modulation unit 33 carries out carries out EFM modulation on the data and adds a data-linking bit to the data before supplying the data to a register 32. Data read out from the register 32 is supplied to the magnetic-head-driving circuit 6 as data EFMO to be written onto the magneto-optical disk 1.

An address generator 39 generates a write/read address at a request made by a multiplexer 40 or a read-base counter 41.

The RAM-read-request-generating unit 42, a RAM-write-request-generating unit 43 and the C1/C2-request-generating unit 44 output their respective signals to the multiplexer 40 which selects one of the signals to be passed on to the address generator 39.

The read-base counter 41 counts the number of clock pulses supplied from a clock generator 34 for each frame in order to generate a clock pulse RFCK for each frame.

In addition, the clock generator 34 supplies a clock signal to the RAM-read-request-generating unit 42, the RAM-write-request-generating unit 43 and the C1/C2-requestgenerating unit 44 which each generate a request signal in accordance with the clock signal. Thus, operations to write data into and to read out data from the RAM 38 are both carried out with timings determined by clock signals LRCK and BCK generated by the clock generator 34.

In addition, the encoding portion 8' provided by this embodiment also has a member functioning as the recording-timing generation unit 8a. The recording-timing generation unit 8a comprises a recording-timing-signal-generating circuit 30 and a controller I/F 31.

As described above, the system controller 11 outputs a recording-start signal RECXPB indicating the start of an operation to record data from the next cluster. The controller I/F 31 decodes this recording-start signal RECXPB. If the recording-start signal RECXPB indicates the start of an operation to record data, the controller I/F 31 outputs a signal set at a high level to the recording-timing-signal-generating circuit 30. If the recording-start signal RECXPB indicates the start of an operation to read out data, on the other hand, the controller I/F 31 outputs a signal set at a low level to the recording-timing-signal-generating circuit 30.

By utilizing the recording-start signal RECXPB and the 1F•START and FD•START signals generated by the address decoder 10, the recording-timing-signal-generating circuit 30 eventually generates a data-supply-start signal ATTX and a laser-power-switching signal ATRECP as output signals.

In order to accomplish the function described above, the recording-timing-signal-generating circuit 30 is provided with a data-supply-start-signal-generating circuit 30a and a laser-power-switching-signal-generating circuit 30b as shown in the figure. Also as shown in the figure, the address decoder 10 includes a 1F•START-generating circuit 10a and an FD•START-generating circuit 10b for generating the 1F•START and FD•START signals respectively.

It should be noted that the configurations of the data-supply-start-signal-generating circuit 30a, the laser-power-switching-signal-generating circuit 30b, the 1F•START-generating circuit 10a and the FD•START-generating circuit 10b will be described later.

4: Recording-Timing Generation Process

FIGS. 3A to 3I show timing charts of operations carried out collectively by the address decoder 10 and the recording-timing-signal-generating circuit 30 as processing to generate recording timings. It should be noted that, for confirmation of what is described earlier, 1 sector consists of 98 EFM frames. The technical term "frame" used in the following description implies an EFM frame.

Figure 3:
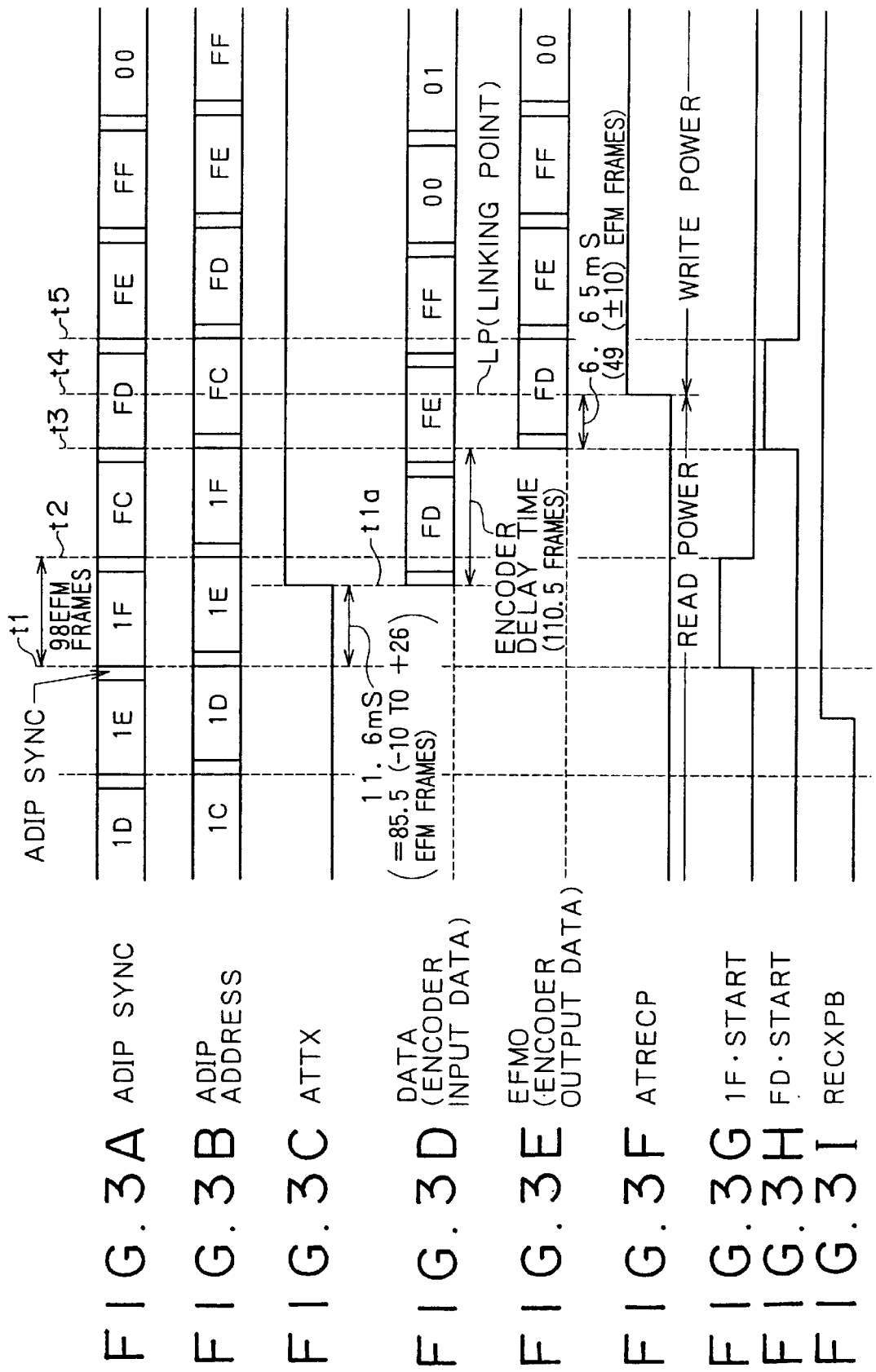
FIGS. 3A to 3I show timing charts of a process to generate recording timings.

FIG. 3A shows an ADIP sync detected for each sector as GFM information supplied to the address decoder 10. Each of the timings shown in this figure is a timing for the position of a disk track actually traced by the laser beam.

FIG. 3B shows an ADIP address (ADIP signal) obtained as a result of an operation to decode an ADIP sync for each sector in the address decoder 10.

Timings shown in FIG. 3B are obtained as a result of an operation to decode an ADIP sync for each sector. As is obvious from comparison of FIG. 3A with FIG. 3B, an ADIP-address timing shown in FIG. 3B lags behind corresponding groove information shown in FIG. 3A by a time corresponding to a sector.

As described above, the address decoder 10 is capable of detecting a sector address with a timing shown in FIG. 3B. The 1F•START-generating circuit 10a employed in the address decoder 10 utilizes a sector-address detection output obtained as shown in FIG. 3B to generate the 1F•START signal shown in FIG. 3G as an output signal. As is obvious by comparison with FIG. 3A, the high level of the 1F•START signal coincides with the sector 1F on is the magneto-optical disk 1 during the period t1 to t2 shown in FIG. 3A or an 1F period. That is to say, during the period t1 to t2, the 1F•START signal shown in FIG. 3G is set at the high level.

By the way, the position of the linking point LP serving as a reference position is prescribed to be a range of +/−10 frames relative to the 49$^{th}$ frame at the middle position of the FD sector. Thus, a data-write start timing to write data onto the magneto-optical disk 1 and a laser-power switching timing to switch the laser power from the read power to the write power, which accompany the data-write start timing, are also required to fall within the range of +/−10 frames prescribed as the linking point LP.

Here, what is to be taken into consideration is the delay time in the EFM/ACIRC encoder & decoder unit 8. The delay time is a period of time from an operation to supply data to be recorded from the buffer memory 13 to an operation to output data EFMO to be written onto the magneto-optical disk 1. In this embodiment, a typical delay time of the EFM/ACIRC encoder & decoder unit 8 is about 15 ms corresponding to 110.5 EFM frames.

Now, refer to FIGS. 3A to 3I. The timing of the linking point LP is the period t3 to t4 where t3 is a point of time at which the FD sector on the magneto-optical disk 1 is started as shown in FIG. 3A and t4 is a point of time corresponding to a position behind the 49$^{th}$ frame shown in FIG. 3E. As a result, the timing to output data EFMO to be written onto the magneto-optical disk 1 must be such a timing that the approximate middle position of the FD sector coincides with the linking point LP at the time t4 as shown in FIG. 3E. It is thus necessary to set the timing to supply the data to be recorded to the EFM/ACIRC encoder & decoder unit 8 by considering the required timing to output the data EFMO to be written onto the magneto-optical disk 1 from the EFM/ACIRC encoder & decoder unit 8 and the delay time of the EFM/ACIRC encoder & decoder unit 8.

In the case of this embodiment, the delay time of the EFM/ACIRC encoder & decoder unit 8 corresponds to 110.5 EFM frames as described above. With the linking point LP at the time t4 taken as a reference point, a timing retrospective by 159.5 frames is seen as a timing to start data to be recorded to the EFM/ACIRC encoder & decoder unit 8 where the 159.5 frames are a sum of a distance of 49 frames from the reference point to the beginning of the FD sector and the delay time of 110.5 frames.

That is to say, the operation to supply the data to be recorded onto the FD sector to the EFM/ACIRC encoder & decoder unit 8 can be started at a time t1a shown in FIG. 3D.

The timing at the time t1a is obtained from the data-supply-start-signal-generating circuit 30a employed in the recording-timing-signal-generating circuit 30.

The data-supply-start-signal-generating circuit 30a detects the timing at the time t1a on the basis of an input 1F•START signal supplied to the data-supply-start-signal-generating circuit 30a with a timing shown in FIG. 3G.

The 1F•START signal rises to the high level at a time t1 preceding the time t4 by 245 (=49+98+98) frames. On the other hand, the time t1a precedes the time t4 by 159.5 frames. Thus, the timing at the time t1a is generated as 85.5 (=245−159.5) frames are counted since the time t1.

To put it concretely, the data-supply-start-signal-generating circuit 30a starts counting the 85.5 frames when detecting the rising edge of the 1F•START signal in order to generate the timing at the time t1a. Then, with this timing, the data-supply-start-signal-generating circuit 30a outputs the data-supply-start signal ATTX as shown in FIG. 3C. That is to say, the data-supply-start-signal-generating circuit 30a sets the output signal at the high level starting at the time t1a.

In accordance with the data-supply-start signal ATTX, the memory controller 12 starts the operation to supply data to be recorded from the buffer memory 13 to the EFM/ACIRC encoder & decoder unit 8. As a result, the EFM/ACIRC encoder & decoder unit 8 receives data to be recorded onto sectors following the FD starting at the time t1a as shown in FIG. 3D. The data to be recorded is subjected to an encoding process in the EFM/ACIRC encoder & decoder unit 8, being delayed by a period of time corresponding to 110.5 frames. The data completing the encoding process is output as the data EFMO to be written onto the magneto-optical disk 1 with a timing shown in FIG. 3E.

By carrying out the operations described so far, it is possible to obtain an appropriate output timing relative to the linking point LP for the encoded data EFMO to be written onto the magneto-optical disk 1.

The FD•START-generating circuit 10b employed in the address decoder 10 outputs the FD•START signal shown in FIG. 3H. As is obvious from comparison of FIG. 3A with FIG. 3H, the FD•START signal is set at an high level during the period of time t3 to t5 corresponding to the FD sector on the magneto-optical disk 1.

The laser-power-switching-signal-generating circuit 30b employed in the recording-timing-signal-generating circuit 30 utilizes the FD•START signal for generating the laser-power-switching signal ATRECP with the timing of the linking point LP.

To put it concretely, the laser-power-switching-signal-generating circuit 30b detects the rising edge of the FD•START signal supplied thereto and counts 49 frames, starting from a time t3. A time t4 is a time at which the $49^{th}$ frame is counted and taken as the timing of the linking point LP. With a timing at the time t4, the laser-power-switching-signal-generating circuit 30b outputs the laser-power-switching signal ATRECP as shown in FIG. 3F. To be more specific, the laser-power-switching-signal-generating circuit 30b changes the level of the laser-power-switching signal ATRECP from the low level to the high level. In accordance with the change in signal level, the laser driver 3b employed in the optical head 3 switches the laser power, which has been set at the read power so far, to the write power. As a result, data after the time t4 shown in FIG. 3E is written into an address shown in FIG. 3A. That is to say, data is recorded in a state where a proper cluster joint is created in the linking area.

It should be noted, however, that the recording-timing generation process explained above by referring to FIGS. 3A to 3H is not carried out unless the recording-start signal RECXPB supplied to the EFM/ACIRC encoder & decoder unit 8 from the system controller 11 by way of the controller I/F 31 is set at the high level as shown in FIG. 3I. That is to say, the recording-timing generation process is not carried out as long as the system controller 11 issues no command to start data recording, beginning with the next cluster. Assume that the recording-start signal RECXPB is kept at the low level even after the time t1 shown in FIGS. 3A to 3I. In this case, neither the data-supply-start signal ATTX shown in FIG. 3C nor the laser-power-switching signal ATRECP shown in FIG. 3F changes to the high level. Thus, the operation to supply data to be recorded to the EFM/ACIRC encoder & decoder unit 8 is not started and the laser power is not switched from the read power to the write power.

By the way, since the recording-start signal RECXPB is a signal requesting that an operation to write data onto the magneto-optical disk 1 be started, beginning with the next cluster, this signal can be output with any timing as far as the timing is within the period of a cluster immediately preceding a cluster to be subjected to a write operation of data onto the magneto-optical disk 1. Since 1 cluster is prescribed to correspond to 2.04 s, the precision of a timing for the system controller 11 to output the recording-start signal RECXPB is about 2 seconds which are extremely lenient.

However, in the case of the timing charts shown in FIGS. 3A to 3I for example, at a time after t1, it is impossible to control the start of the operation to supply data to be recorded to the EFM/ACIRC encoder & decoder unit 8 with a proper timing based on the 1F•START signal rising at the time t1 even if the timing is a timing prior to the next cluster. Thus, it is necessary to control the start of the operation to supply data to be recorded to the EFM/ACIRC encoder & decoder unit 8 with a timing prior to the time t1.

It should be noted that, in generation of the laser-power-switching signal ATRECP signal shown in FIG. 3F for example, there is a conceivable configuration wherein 245 (=49+98+98) frames are counted, starting at the rise time of the 1F•START signal shown in FIG. 3G. In this case, however, the number of counted frames increases. It is thus necessary for example to allocate additional bits for the increase in frame count in a counter employed in the laser-power-switching-signal-generating circuit 30b with a configuration to be described later. In addition, since the number of counted frames is large, it is quite within the bounds of possibility that the number of time errors rises to a certain degree. In order to solve these problems, this embodiment utilizes the FD•START signal obtained after the 1F•START signal so that even a small number of counted frames is sufficient.

5: Configuration of the Circuit for Recording-Timing Generation

Figure 4:
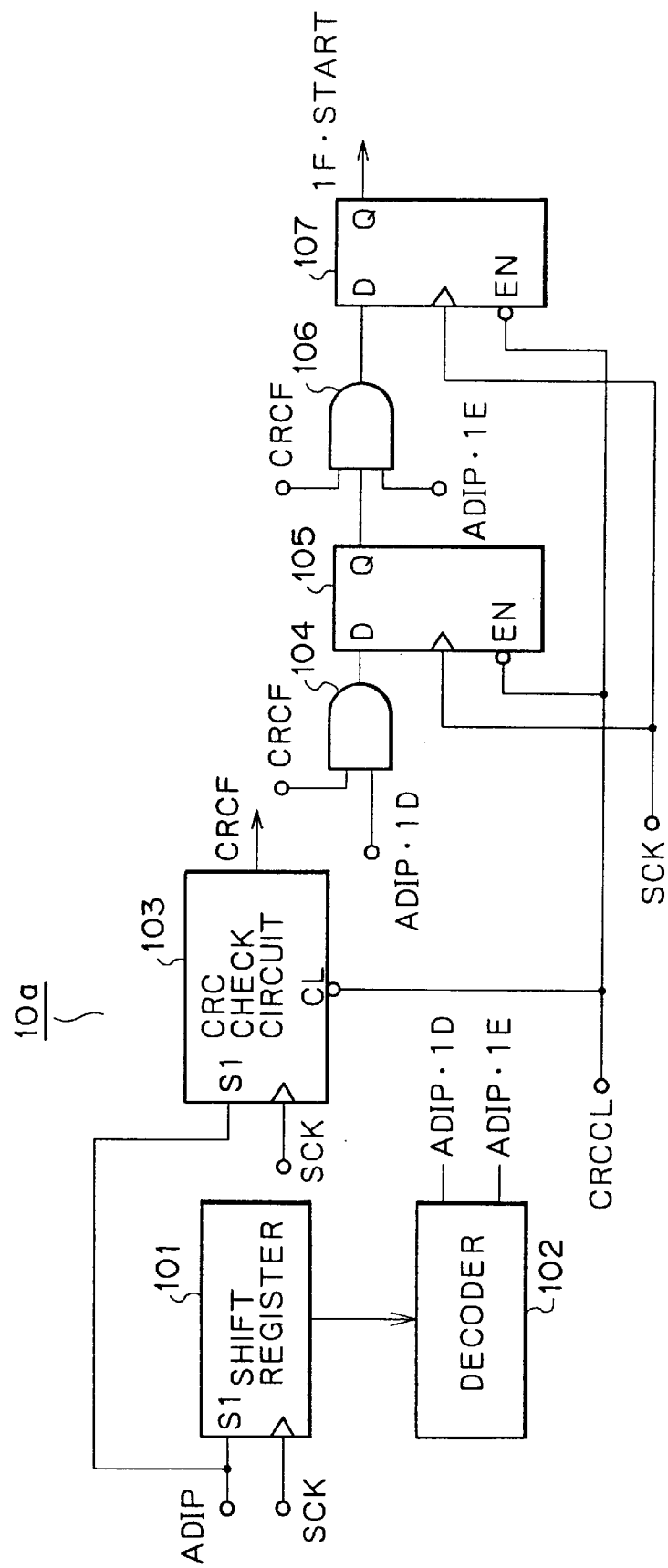
FIG. 4 is a block diagram showing a typical configuration of a 1F•START-generating circuit.

As is obvious from the descriptions given so far, in order to implement the operations represented by the time charts shown in FIGS. 3A to 3I, it is necessary to provide the address decoder 10 with the 1F•START-generating circuit 10a as well as the FD•START-generating circuit 10b and the recording-timing-signal-generating circuit 30 employed in the EFM/ACIRC encoder & decoder unit 8 with the data-supply-start-signal-generating circuit 30a as well as the laser-power-switching-signal-generating circuit 30b. Typical configurations of the 1F•START-generating circuit 10a, the FD•START-generating circuit 10b, the data-supply-start-signal-generating circuit 30a and the laser-power-switching-signal-generating circuit 30b are described as follows:

FIG. 4 is a diagram showing a typical configuration of the 1F•START-generating circuit 10a employed in the address decoder 10.

As shown in the figure, the internal configuration of the 1F•START-generating circuit b1a comprises a shift register 101, a decoder 102, a CRC check circuit 103, an AND gate 104, an AND gate 106, a flip-flop 105 and a flip-flop 107. An operation clock signal SCK is generated by a PLL circuit employed in a recording-signal system not shown in the figure on the basis of an ADIP signal to be recorded onto the magneto-optical disk 1. The clock signal SCK is synchronous with the frequency of an EFM signal according to a line speed (or a data rate) used at that time.

In the 1F•START-generating circuit 10a shown in this figure, an ADIP sync signal is supplied to the register 101 and the CRC check circuit 103.

The shift register 101 passes on the ADIP sync signal to the decoder 102. The ADIP sync signal is a synchronization pattern obtained typically as the ADIP sync signal shown in FIG. 3A for each sector. By analyzing the ADIP sync signal supplied thereto, in this case, the decoder 102 generates an ADIP•1D signal set at a high level during the period of the 1D sector and an ADIP•1E signal set at a high level during the period of the 1E sector.

The CRC check circuit 103 checks the ADIP sync signal supplied thereto to determine whether or not the signal matches the sector number to be actually associated with the signal. If the ADIP sync signal matches such a sector number, the CRC check circuit 103 sets its output signal CRCF at the high level.

It should be noted that a CRCCL signal is a signal for clearing a result of the processing carried out by the CRC check circuit 103. The CRCCL signal is supplied with timings each corresponding to a delimiter between 2 consecutive sectors. In addition, the inverted signal of the CRCCL signal is supplied to the flip-flops 105 and 106 as an enable signal.

The CRCF signal and the ADIP•1D signal are supplied to the AND gate 104. The CRCF signal represents a result of examination carried out by the CRC check circuit 103 for the 1D sector. Thus, if the ADIP signal for the 1D sector is properly correct, the AND gate 104 outputs a signal set at a high level to the flip-flop 105. As a result, the flip-flop 105 outputs a signal set at a high level over the period of 1 sector with the same timing as the ADIP•1E signal.

The AND gate 106 computes the logical product of the output of the flip-flop 105, the ADIP•1E signal and the CRCF signal. Thus, if the ADIP signal for the 1E sector is properly correct, the AND gate 106 outputs a signal set at an high level to the flip-flop 107.

As a result, the flip-flop 107 outputs a signal set at a high level over the period of 1 sector following the ADIP•1E signal. This signal serves as the 1F•START signal representing a timing of data for the 1F sector on the magneto-optical disk 1.

That is to say, the circuit block shown in FIG. 4 has a configuration which confirms the continuity of two 1D and 1E sectors immediately preceding the 1F sector before outputting the 1F•START signal. In this way, it is possible to prevent a sector other than the 1F sector from being incorrectly recognized as the 1F sector. As a result, the operations shown in FIGS. 3A to 3I can be carried out with a high degree of stability.

Figure 5:
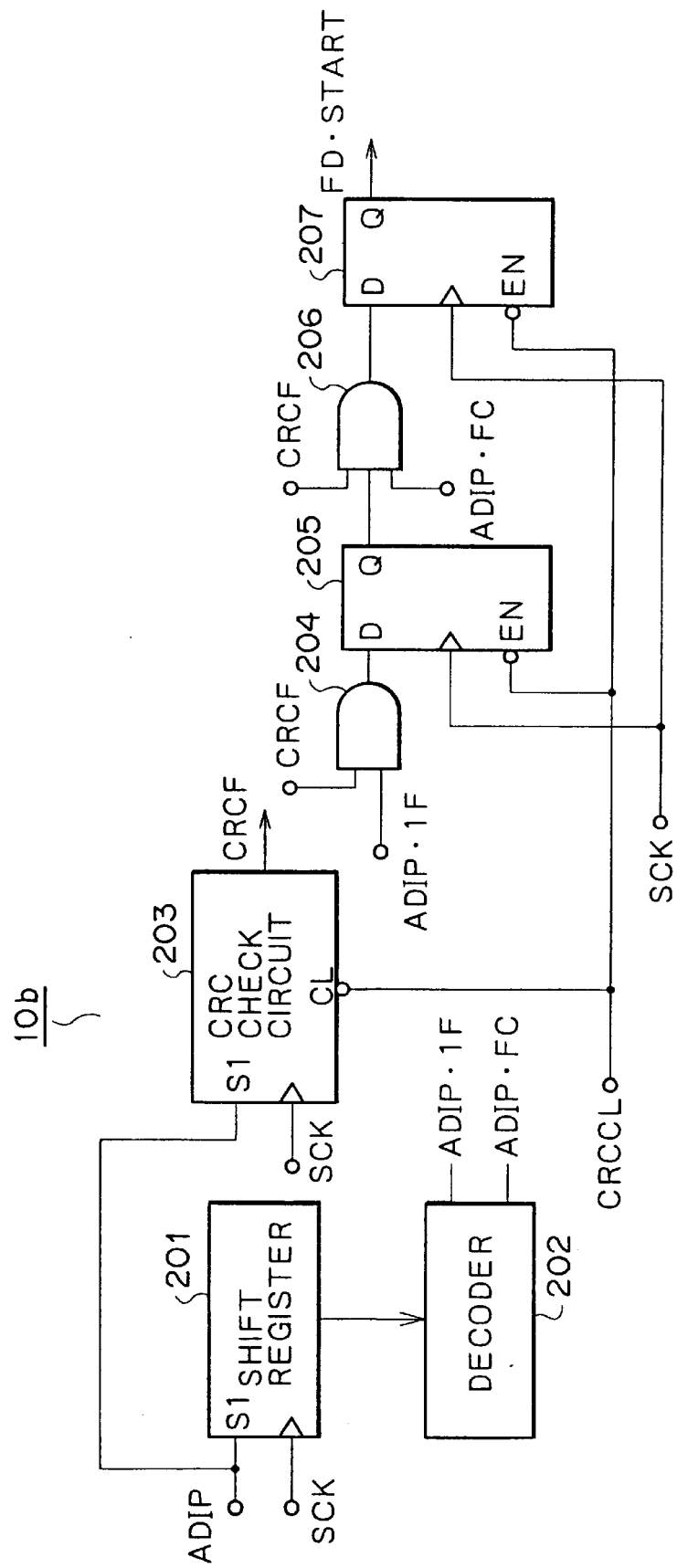
FIG. 5 is a block diagram showing a typical configuration of an FD•START-generating circuit.

FIG. 5 is a diagram showing the configuration of the FD•START-generating circuit 10b.

The configuration of each block shown in FIG. 5 is the same as that shown in FIG. 4. To be more specific, the configurations and the interconnections of a shift register 201, a decoder 202, a CRC check circuit 203, an AND gate 204, an AND gate 206, a flip-flop 205 and a flip-flop 207 are identical with the configurations and the interconnections of the shift register 161, the decoder 102, the CRC check circuit 103, the AND gate 104, the AND gate 106, the flip-flop 105 and the flip-flop 107 respectively.

The decoder 202 employed in the FD•START-generating circuit 10b sets ADIP-1F and ADIP•FC signals at the high level during respectively the periods of the 1F sector and the FC sector following the 1F sector. The ADIP•1F and ADIP•FC signals are supplied to the AND gates 204 and 206 respectively.

As a result, the flip-flop 207 sets the FD•START signal at the high level over the period of the FD sector.

It should be noted that the 1F•START-generating circuit 10a shown in FIG. 4 and the FD•START-generating circuit 10b shown in FIG. 5 may actually share common blocks.

Figure 6:
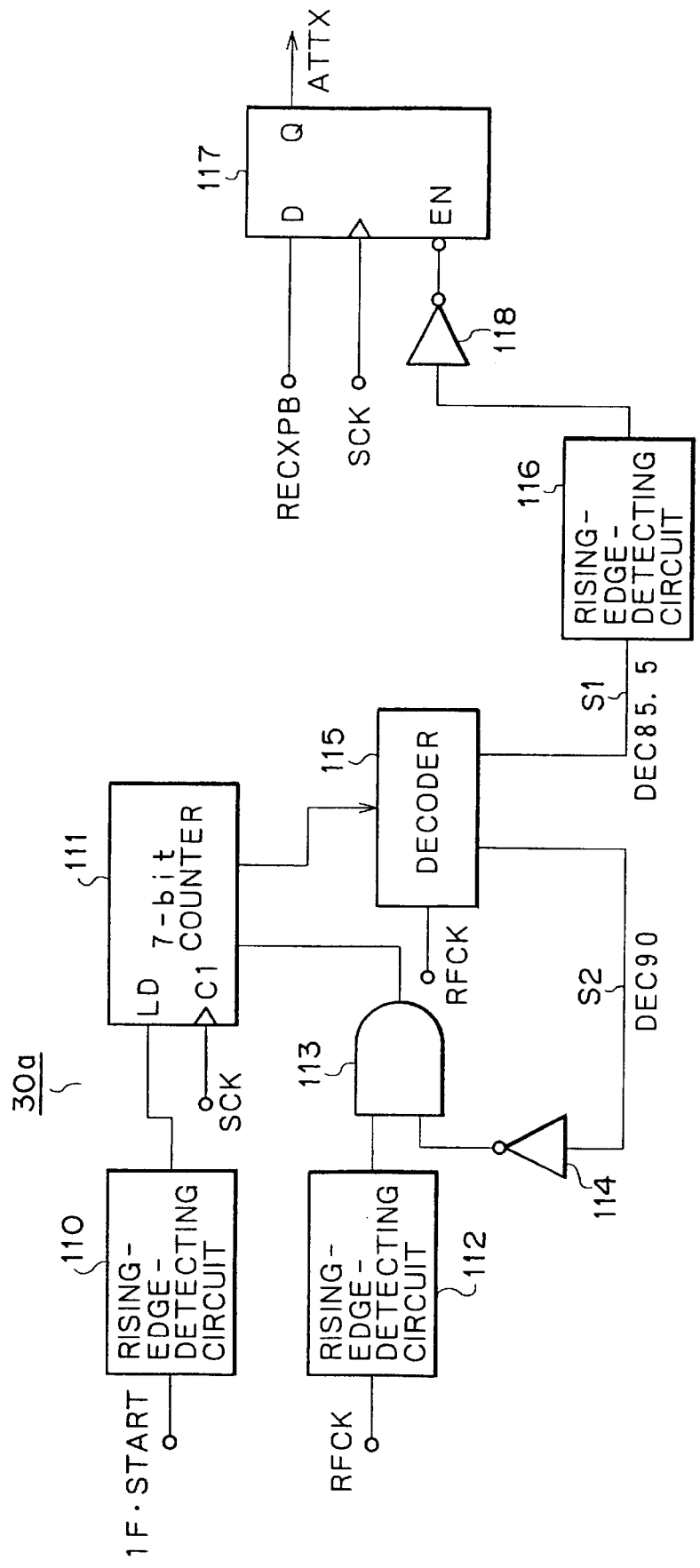
FIG. 6 is a block diagram showing a typical configuration of a data-supply-start-signal-generating circuit.

FIG. 6 is a diagram showing a typical configuration of the data-supply-start-signal-generating circuit 30a for generating the data-supply-start signal ATTX.

The 1F•START signal generated by the 1F•START-generating circuit 10a is supplied to a rising-edge-detecting circuit 110 shown in the figure. The rising-edge-detecting circuit 110 detects the rising edge of the data-supply-start signal ATTX, supplying a detection signal indicating the rising edge to a load pin of a 7-bit counter 111. As a result, zeros are loaded to all the bits of the 7-bit counter 111 on the rising edge of the 1F•START signal. The count output of the 7-bit counter 111 is supplied to a decoder 115.

A clock signal RFCK is a clock signal synchronous with periods of frames output by the read base counter 41 shown in FIG. 2.

A rising-edge-detecting circuit 112 detects the rising edge of the clock signal RFCK, supplying a detection signal indicating the rising edge to an AND gate 113.

The AND gate 113 computes a logical product of the detection signal received from the rising-edge-detecting circuit 112 and a signal S2 supplied by the decoder 115 by way an inverter 114, outputting a signal to a carry-in pin of the 7-bit counter 111. As a clock input, a clock signal SCK is supplied to the 7-bit counter 111. As a result, the 7-bit counter 111 counts up on each rising edge of the clock signal RFCK. The operation of the 7-bit counter 111 is thus an operation to count the number of RFCK pulses or the number of frames When the contents of the 7-bit counter 111 become equal to 85.5, the decoder 115 sets a signal S1 at the high level. A rising-edge-detecting circuit 116 detects the rising edge of the signal S1, outputting a detection signal indicating the rising edge to a flip-flop 117 as an enable signal by way of an inverter 118 for inverting the signal S1. The recording-start signal RECXPB generated by the system controller 11 as shown in FIG. 3I is supplied as a data input to the flip-flop 117. It should be noted that, as a clock input, the clock signal SCK is supplied to the flip-flop 117.

With the recording-start signal RECXPB signal set at the high level, the flip-flop 117 sets its output to the high level at a point of time 85.5 frames are counted since the detection of the rising edge of the 1F•START signal. The output of the flip-flop 117 is the data-supply-start signal ATTX with a timing shown in FIG. 3C.

As the contents of the 7-bit counter 111 reach 90, the decoder 115 sets its output signal S2 at the high level. As described earlier, the signal S2 is supplied to the AND gate 113 by way of the inverter 114 for inverting the signal S2, resetting the output of the AND gate 113 to the low level. As a result, the counting operation of the 7-bit counter 111 is halted. The count of 90 used as a criterion for setting the signal S2 at the high level is made greater than the count of 85.5 used as a criterion for setting the signal S1 at the high level by a difference to provide a margin to a certain degree. Such a margin is taken into consideration to avoid a malfunction wherein the counting operation is halted before the generation of the signal S1 is assured with a high degree of certainty. The margin is not limited to this value as long as the generation of the signal S1 is assured with a high degree of certainty.

Figure 7:
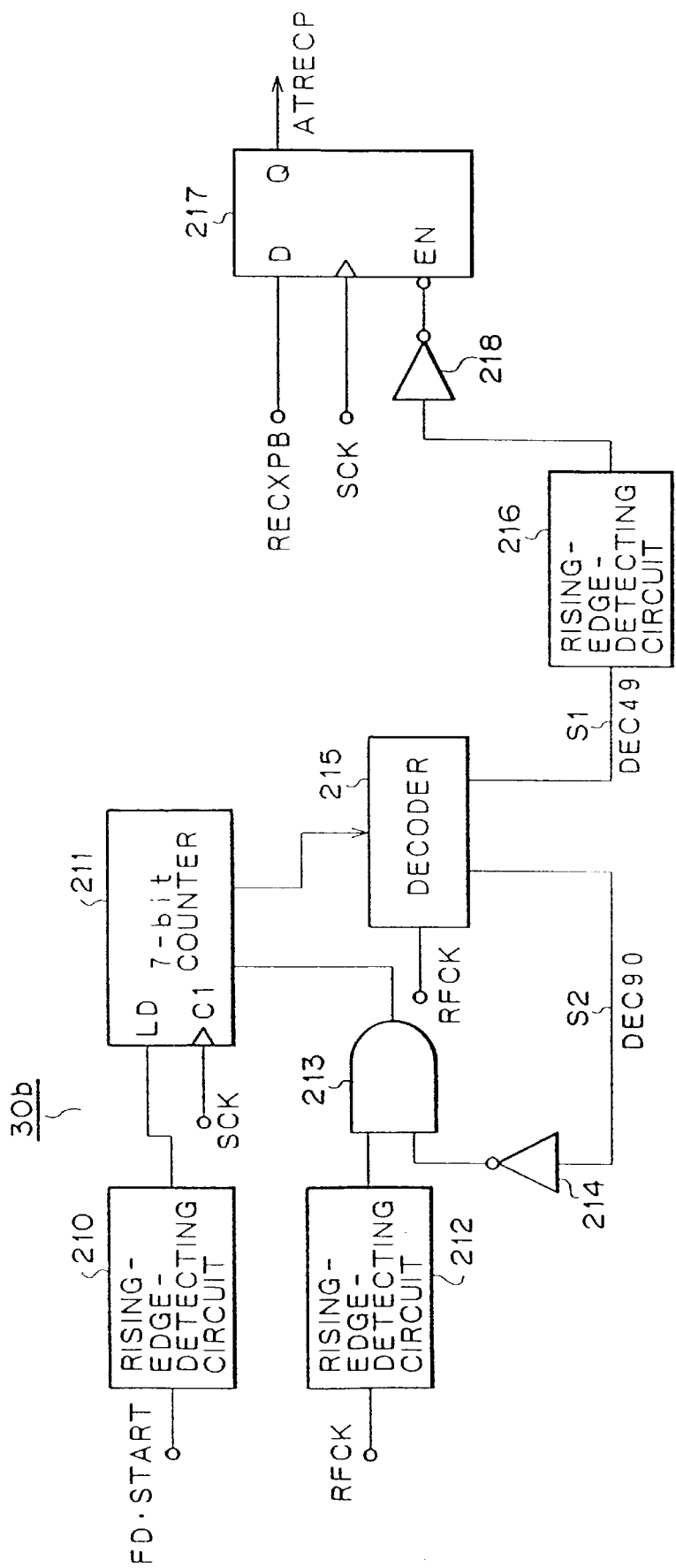
FIG. 7 is a block diagram showing a typical configuration of a laser-power-switching-signal-generating circuit.

FIG. 7 is a diagram showing a typical configuration of the laser-power-switching-signal-generating circuit 30b for generating the laser-power-switching signal ATRECP.

The configuration of each block shown in FIG. 7 is identical with the configuration of the counterpart of the block shown in FIG. 6. To be more specific, the configurations and the interconnections of a rising-edge-detecting circuit 210, a rising-edge-detecting circuit 212, a rising-edge-detecting circuit 216, a 7-bit counter 211, an AND gate 213, an inverter 214, a decoder 215, a flip-flop 217 and an inverter 218 which are shown in FIG. 7 are identical with the rising-edge-detecting circuit 110, the rising-edge-detecting circuit 112, the rising-edge-detecting circuit 116, the 7-bit counter 111, the AND gate 113, the inverter 114, the decoder 115, the flip-flop 117 and the inverter 118 which are shown in FIG. 6.

In the laser-power-switching-signal-generating circuit 30b shown in FIG. 7, the FD•START signal generated by the FD•START-generating circuit 10b is supplied to the rising-edge-detecting circuit 210.

When the contents of the counter 211 become equal to 49, the detector 215 sets a signal S1 at the high level. The rising-edge-detecting circuit 216 detects the rising edge of the signal S1, outputting a detection signal indicating the rising edge to the flip-flop 217 as an enable signal by way of the inverter 218 for inverting the signal S1. The recording-start signal RECXPB generated by the system controller 11 as shown in FIG. 3I is supplied as a data input to the flip-flop 217.

With the recording-start signal RECXPB signal set at the high level, the flip-flop 217 sets its output to the high level at a point of time 49 frames are counted since the detection of the rising edge of the FD•START signal. The output of the flip-flop 217 is the laser-power-switching signal ATRECP with a timing shown in FIG. 3F.

It should be noted that the data-supply-start-signal-generating circuit 30a shown in FIG. 6 and the laser-power-switching-signal-generating circuit 30b shown in FIG. 7 may share as many common circuit blocks as possible.

In the configurations of the embodiment described above, the EFM/ACIRC encoder & decoder unit 8 is capable of automatically generating the data-supply-start signal ATTX and the laser-power-switching signal RECXPB internally. The data-supply-start signal ATTX is a command signal generated internally for indicating a timing to start an operation to supply data to be recorded to the EFM/ACIRC encoder & decoder unit 8. On the other hand, the laser-power-switching signal RECXPB is a command signal generated internally for making a request for switching the laser power at a linking point in the course of an operation carried out by the EFM/ACIRC encoder & decoder unit 8 to encode data supplied thereto and output data to be written. The EFM/ACIRC encoder & decoder unit 8 is capable of automatically generating these command signals internally because of its configuration wherein internal signal processing is carried out in sector and frame units. By detecting these data units and resorting to counting operations and the like, the EFM/ACIRC encoder & decoder unit 8 is capable of internally generating the data-supply-start signal ATTX and the laser-power-switching signal RECXPB with ease.

In the conventional recording & playback apparatus, for example, the system controller 11 executes these kinds of timing control. To put it in detail, while monitoring the ADIP signal, the system controller 11 outputs the data-supply-start signal to the memory controller 12 and the laser-power-switching signal to the laser driver 3b. That is to say, timings to supply data to and output data from the EFM/ACIRC encoder & decoder unit 8 and a timing to write data into the magneto-optical disk 1 in accordance with the timings to supply data and output data are controlled by an external controller. With this technique, however, precision is limited.

In the case of this embodiment, on the other hand, the EFM/ACIRC encoder & decoder unit 8 is capable of generating these timings internally on the basis of address information obtained from the magneto-optical disk 1 as the ADIP signal. Thus, the precision is assured with a higher degree of reliability. As control executed by the system controller 11 in this embodiment to start a recording operation, for example, the laser-power-switching signal RECXPB is output to request that an operation to write data onto the magneto-optical disk 1 starting be started from the next sector with a timing allowing for a very lenient precision range of about 2 seconds as is obvious from the above description.

In recent years, particularly, data is recorded on an MD at a multiple-time speed. Even in this case, with the aforementioned configuration of this embodiment, sufficiently high precision can be sustained as long as an ADIP signal for the multiple-time speed is obtained.

Also in recent years, for example, simplification of control to drive the disk rotation and reduction of the power consumption are taken into consideration to desirably aim at a capability of driving the disk at a CAV (Constant Angular Velocity) even for media (such as an MD) of a driving system based on the CLV. In an attempt to use an external system controller for execution of timing control in an application of the CAV driving to media of a driving system based on the CLV, it is necessary to execute the timing control by adaptation to different data rates for inner and outer-circumference sides. Thus, the timing control becomes extremely complicated. With the configuration of this embodiment, on the other hand, it is possible to generate a timing appropriate for the current linear velocity with ease provided that processing is carried out with a timing of the ADIP signal detected at that time even if the linear speed varies.

It should be noted that the scope of the present invention is not limited to the embodiment.

For example, there are other possible configurations of the circuit for automatically generating the data-supply-start signal ATTX and the laser-power-switching signal RECXPB. That is to say, other embodiments are conceivable in addition to the circuits shown in the figures.

In addition, in the embodiment, the laser-power-switching signal RECXPB is generated with a timing of a linking point. Thus, the laser-power-switching signal RECXPB can be regarded as a signal no other than a detection signal of the timing of a linking point. Therefore, the configuration of the present invention can also be applied to a case in which it is necessary to detect the timing of a linking point other than switching of the laser power and apply the result of the detection in recording & playback apparatus employing the signal-processing apparatus provided by the present invention.

Furthermore, the embodiment implements an application of the present invention to recording & playback apparatus for MDs. It should be noted, however, that the present invention can also be applied to a signal-processing apparatus for a variety of media having a linking area as part of the format besides the MD.

Moreover, in the case of the MD, a timing to start an operation to supply data and a timing of a linking point are obtained on the basis of addresses recorded on the disk as a wobbled groove (ADIP). It is worth noting, however, that the present invention can also be applied to, for example, media in which addresses are recorded in another format.

In accordance with the present invention described above, the signal-processing apparatus is capable of internally generating a timing signal specifying a timing to start an operation to supply a decoder unit (decoding means) with sectors (division-data units) including a linking point prescribed in a linking area as a joint between clusters (recorded-data units). In order to implement this capability, a predetermined number of frames (encoded-data units) are counted, starting from a point of time at which an address corresponding to a specific one of the sectors is detected.

In addition, the signal-processing apparatus is also capable of internally detecting the timing of a linking point for data to be written onto the disk. The data to be written onto the disk is obtained as a result of a decoding process carried out by the decoder unit on the division-data units supplied to a decoder unit in an operation started by the timing signal described above. The generation of these timings are based on address information detected from the recording medium.

In the conventional recording & playback apparatus, for example, a system controller external to the signal-processing apparatus generates the timing signal described above and detects the linking point. Thus, precision is limited. In accordance with the present invention, however, it is possible to easily generate a timing signal with a high degree of precision and to detect a timing with ease. Conversely speaking, very lenient precision is allowed for the control executed by the system controller so that the processing load is reduced substantially. In addition, it is possible to easily detect timings with a high degree of precision even at, for example, a driving speed higher than the ordinary 1-time speed.

With regard to the present invention in particular, it is possible to detect timings with a high degree of precision even if for example a disk of the conventional CAV system is driven into rotation in accordance with a CLV system. Also in future developments of technologies for recording by driving a disk of the conventional CAV system into rotation in accordance with a CLV system, the present invention is capable of providing a technology configuration serving as a very useful aid to the developments.

Moreover, address information used in the detection of the timings described above is stored as a zigzag shape created on a recording track of the recording medium. Thus, by creating a zigzag shape on a recording track of a disk-like recording medium, it is possible to exhibit an effect of an effective and wide application to a signal-processing apparatus supporting a format of recording absolute addresses.

Furthermore, in the case of the present embodiment for detecting a linking point, a command signal for switching the laser power for example from the read (playback) level to the write (recording) level is output at a timing to detect the linking point. Thus, the timing to start an operation to write data into the linking point required by the format can always be determined correctly, allowing the reliability of the recorded data to be improved.

While a preferred embodiment of the present invention has been described using specific terms, such description is for illustrative purposes only, and it is to be understood that changes and variations may be made without departing from the spirit or scope of the following claims.

What is claimed is:

1. A signal-processing apparatus for carrying out a recording operation to record data onto a recording medium in predetermined recorded-data units, which are each an array consisting of a predetermined number of division-data units each comprising a predetermined number of encoded-data units, and for carrying out signal processing for said recording operation in conformity with a format prescribing a linking area for linking consecutive recorded-data units to each other, said signal-processing apparatus comprising:

an encoding means for inputting data, carrying out predetermined signal processing suitable for an operation to record said input data onto said recording medium and outputting data to be written into said recording medium; and a timing generation means for generating a timing signal indicating a timing to start an operation to provide said encoding means with said division-data units including a linking point described in said linking area by counting said predetermined number of said encoded-data units with a timing to detect address information for a specific one of said division-data units from said recording medium.

2. A signal-processing apparatus according to claim 1 wherein said address information is recorded on said recording medium by forming a zigzag shape on a recording track of said recording medium having a disk shape.

3. A signal-processing method for carrying out a recording operation to record data onto a recording medium in predetermined recorded-data units, which are each an array consisting of a predetermined number of division-data units each comprising a predetermined number of encoded-data units, whereby signal processing is carried out for said recording operation in conformity with a format prescribing a linking area for linking consecutive recorded-data units to each other, said signal-processing method comprising the steps of:

carrying out an encoding process to input data, perform predetermined signal processing suitable for an operation to record said input data onto said recording medium and output data to be written into said recording medium; and carrying out a timing generation process to generate a timing signal indicating a timing to start processing carried out in said encoding process on said division-data units including a linking point described in said linking area by counting said predetermined number of said encoded-data units with a timing to detect address information for a specific one of said division-data units from said recording medium.

4. A signal-processing apparatus for carrying out a recording operation to record data onto a recording medium in predetermined recorded-data units, which are each an array consisting of a predetermined number of division-data units each comprising a predetermined number of encoded-data units, and for carrying out signal processing for said recording operation in conformity with a format prescribing a linking area for linking consecutive recorded-data units to each other, said signal-processing apparatus comprising:

an encoding means for inputting data, carrying out predetermined signal processing suitable for an operation to record said input data onto said recording medium and outputting data to be written into said recording medium;

a timing generation means for generating a timing signal indicating a timing to start an operation to provide said encoding means with said division-data units including a linking point described in said linking area by counting said predetermined number of said encoded-data units with a timing to detect address information for a specific one of said division-data units from said recording medium; and a linking-point detection means for detecting a timing to output a signal indicating said linking point from said encoding means by counting said predetermined number of said encoded-data units with a timing to detect address information for a specific one of said division-data units from said recording medium.

5. A signal-processing apparatus according to claim 4 wherein said address information is recorded on said recording medium by forming a zigzag shape on a recording track of said recording medium having a disk shape.

6. A signal-processing apparatus according to claim 4, said signal-processing apparatus further having a command-signal-outputting means for outputting a command signal requesting that the power of a laser beam to be radiated to said recording medium be changed with a timing detected by said linking-point detection means.

7. A signal-processing method for carrying out a recording operation to record data onto a recording medium in predetermined recorded-data units, which are each an array consisting of a predetermined number of division-data units each comprising a predetermined number of encoded-data units, whereby signal processing is carried out for said recording operation in conformity with a format prescribing a linking area for linking consecutive recorded-data units to each other, said signal-processing method comprising the steps of:

carrying out an encoding process to input data, perform predetermined signal processing suitable for an operation to record said input data onto said recording medium and output data to be written into said recording medium;

carrying out a timing generation process to generate a timing signal indicating a timing to start processing carried out in said encoding process on said division-data units including a linking point described in said linking area by counting said predetermined number of said encoded-data units with a timing to detect address information for a specific one of said division-data units from said recording medium; and carrying out a linking-point detection process to detect a timing of said encoding process to output a signal indicating said linking point by counting said predetermined number of said encoded-data units with a timing to detect address information for a specific one of said division-data units from said recording medium.

* * * * *